No. 696,861. Patented Apr. 1, 1902.
D. DOWNS & D. W. DRAPER.
GRAIN CAR DOOR.
(Application filed June 7, 1901.)
(No Model.)
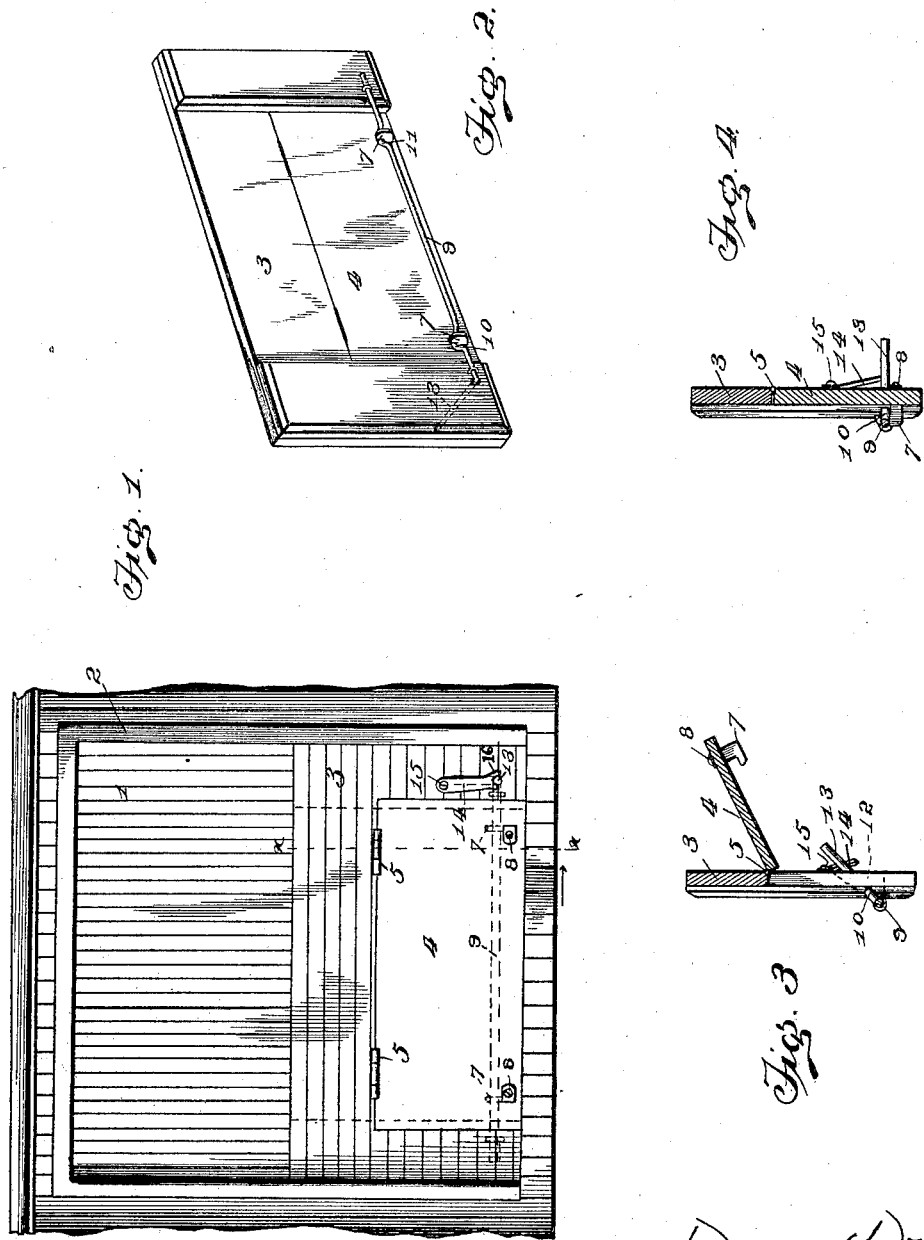

UNITED STATES PATENT OFFICE.

DUNCAN DOWNS AND DANIEL W. DRAPER, OF WEST SUPERIOR, WISCONSIN.

GRAIN-CAR DOOR.

SPECIFICATION forming part of Letters Patent No. 696,861, dated April 1, 1902.

Application filed June 7, 1901. Serial No. 63,619. (No model.)

*To all whom it may concern:*

Be it known that we, DUNCAN DOWNS and DANIEL W. DRAPER, citizens of the United States, residing at West Superior, in the county of Douglas and State of Wisconsin, have invented certain new and useful Improvements in Grain-Car Doors; and we do hereby declare the following to be a full, clear, and exact description of the invention, such as will enable others skilled in the art to which it appertains to make and use the same.

This invention relates to grain-car doors, and has for its object to provide a grain-car door of simple, economical, and strong construction which may be quickly and easily opened or closed and locked or unlocked when desired.

As is well known, grain-cars are provided with supplementary doors on the inside of the door-opening, which may or may not be closed on the outside, such supplementary door being of a height less than that of the opening and provided with means for sliding it up and down or swinging it on a vertical pintle, if desired.

With the before-mentioned object in view our invention consists of a supplementary door of the class described provided with an auxiliary door or trap comprising a part of the lower portion of the supplementary door, opening outwardly on hinges along its upper edge, and improved means for securing such trap, the construction, arrangement, and combination of the parts of which will be hereinafter fully described and afterward specifically claimed.

In the accompanying drawings, Figure 1 illustrates in side elevation part of a car including the door-casing, provided with a supplementary door and trap constructed in accordance with our invention, the trap being closed. Fig. 2 is a detail perspective view of the inside of the supplementary door and trap, the trap being closed and locked. Fig. 3 is a detail sectional view through the supplementary door and trap on the line $x\,x$ of Fig. 1 looking in the direction of the arrow, the trap being open. Fig. 4 is a similar view with the trap closed.

Like numerals indicate the same parts wherever they occur in the various figures of the drawings.

Referring to the drawings by numerals, 1 indicates the usual side opening in a freight or grain car, 2 the casing which surrounds the same, and 3 the supplementary inside door used in a grain-car. This door, as will be plainly seen, is supported within the door-casing and closes the lower portion of the door-opening 1. It may or may not be provided with means for sliding it up and down or for hinging it on a vertical pintle to throw it in against the side of the car when not in use.

4 indicates an auxiliary door or trap of a proper size to fill when closed the opening in the lower edge of the supplementary door 3, the trap being secured at its upper edge by hinges 5, which permit it to swing outwardly at its lower edge.

7 7 indicate hooks composed of angular pieces of sheet metal located in notches in the lower edge of the trap, projecting inward therefrom, and secured upon its outer edge by means of screws 8.

9 indicates a double-cranked rod pivotally secured to the inner face of the supplementary door, near the lower edge thereof, in position to permit its cranked portion 10 11 to engage the hooks 7, before mentioned, when the trap is closed. At one end of the rod 9 it is bent at right angles and extended through a slot 12 to and beyond the outer face of the supplementary door, thereby providing a handle 13 for turning the rod projecting through the door in convenient position for operation.

14 indicates a locking arm or pawl pivotally secured upon a screw 15 on the outside of the supplementary door in position to be swung into the path of movement of the handle 13 to lock it in the position it assumes when the cranks 10 and 11 of the rod 9 are engaged with the hooks 7 of the trap, said pawl being prevented from passing the locking position by means of a projecting tooth 16 at its outer end.

The supplementary door being in position inside the casing of the main doorway with the trap locked, the pawl 14 may be swung out of the path of the handle of the locking-rod and the handle thrown upward. This will release the cranks 10 and 11 of the rod 9 from engagement with the hooks 7 of the trap to permit the trap to be opened outward on the hinges. The reversal of this action after the trap has been closed will throw the cranks 10 and 11 into engagement with the hooks 7, the handle 13 being brought down to its lower position, where it may be locked by the pawl 14, as hereinbefore described.

The simplicity, strength, and economy of this construction, as well as its ease of operation and security when locked, will be obvious from the foregoing description, and it will be further obvious that the handle 13 or pawl 14 may be sealed or otherwise held in their locked position by means such as padlock or otherwise, if so desired.

Having thus fully described our invention, what we claim as new, and desire to secure by Letters Patent of the United States, is—

1. A supplementary door for use inside the door-casing of a grain-car provided with an opening in its lower edge, a trap hinged at its upper edge in position to fill said opening when closed, upwardly-pointed hooks projecting inward from the lower edge of the trap, a rod pivotally secured on the inner side of the supplementary door provided with double crank bends adapted to engage said hooks for locking the trap, and means operable from the outside of the door for manipulating said rod, substantially as described.

2. A supplementary grain-car door, provided with an opening in its lower edge, a trap hinged at its upper edge in said opening and provided at its lower edge with notches, angularly-bent arms of sheet metal located in said notches and projecting in the form of upwardly-pointed hooks inside of the trap, screws for securing the inner flanges of the angular arms upon the outside of the trap, a rod pivoted upon the inside of the supplementary door and provided with crank bends adapted to engage said hooks, and a handle projecting through the supplementary door to the outside for manipulating said crank bends, substantially as described.

3. A supplementary door for grain-cars having an opening at its lower edge, a trap pivoted at its upper edge in said opening, upwardly-pointed, inwardly-projecting hooks at the lower edge of the trap, a rod pivotally secured to the inside of the supplementary door having crank bends adapted to engage with said hooks and bent at one end to form a handle, said handle projecting through a slot in the supplementary door and a locking-pawl pivoted to the outside of the supplementary door and adapted to hold the projecting handle in its locked position, substantially as described.

4. A supplementary door for use inside the door-casing of a grain-car provided with an opening in its edge, a trap hinged in position to fill said opening when closed, a hook carried by the inner face of said trap, a rod pivotally secured on the inner side of the supplementary door provided with a crank bend adapted to engage said hook for locking the trap, and means for rotating said rod for bringing said crank bend into and out of engagement with said hook, substantially as described.

5. A supplementary grain-car door, provided with an opening, a trap hinged to said door in position to fill said opening, hooks projecting inwardly from the inner face of said trap, a rod pivoted to said door and extending longitudinally across said trap, crank bends formed in said rod and adapted by rotation of said rod to be brought into engagement with said hooks for locking said trap in a closed condition, and means outside said door for rotating said rod, substantially as described.

6. A supplementary grain-car door, provided with an opening, a trap hinged to said door in position to fill said opening, hooks projecting inwardly from the inner face of said trap, a rod pivoted to said door and extending longitudinally across said trap, crank bends formed in said rod and adapted by rotation of said rod to be brought into engagement with said hooks for locking said trap in a closed condition, means outside said door for rotating said rod, and means for preventing such rotation, substantially as described.

7. A supplementary grain-car door, provided with an opening, a trap hinged to said door in position to fill said opening, hooks projecting inwardly from the inner face of said trap, a rod pivoted to said door and extending longitudinally across said trap, crank bends formed in said rod and adapted by rotation of said rod to be brought into engagement with said hooks for locking said trap in a closed condition, means outside said door for rotating said rod, comprising a portion of said rod bent at an angle and extending through a slot in said door thereby forming a handle, and a pawl pivoted to said door and adapted to swing into the path of movement of said handle and engage the same for locking it against movement, substantially as described.

In testimony whereof we hereunto affix our signatures in presence of two witnesses.

DUNCAN DOWNS.
DANIEL W. DRAPER.

Witnesses:
JAMES T. WATSON,
JOHN J. KUSE.